US010637667B2

(12) United States Patent
Owlett et al.

(10) Patent No.: US 10,637,667 B2
(45) Date of Patent: *Apr. 28, 2020

(54) GENERATION OF A DIGITAL SIGNATURE

(71) Applicant: International Business Machines Corporation, Armonk, NY (US)

(72) Inventors: John Owlett, Hampshire (GB); George M. Thompson, Hampshire (GB); Keith A. Walton, London (GB)

(73) Assignee: International Business Machines Corporation, Armonk, NY (US)

(*) Notice: Subject to any disclaimer, the term of this patent is extended or adjusted under 35 U.S.C. 154(b) by 513 days.

This patent is subject to a terminal disclaimer.

(21) Appl. No.: 15/040,044

(22) Filed: Feb. 10, 2016

(65) Prior Publication Data

US 2016/0164684 A1 Jun. 9, 2016

Related U.S. Application Data

(63) Continuation of application No. 14/491,206, filed on Sep. 19, 2014, which is a continuation of application (Continued)

(30) Foreign Application Priority Data

Dec. 21, 2002 (GB) .................................. 0229894.1

(51) Int. Cl.
*H04L 9/32* (2006.01)
*H04L 29/06* (2006.01)

(52) U.S. Cl.
CPC .......... *H04L 9/3247* (2013.01); *H04L 9/3236* (2013.01); *H04L 63/0457* (2013.01); *H04L 2209/56* (2013.01); *H04L 2209/60* (2013.01)

(58) Field of Classification Search
CPC . H04L 9/3247; H04L 9/3236; H04L 63/0457; H04L 2209/56; H04L 2209/60
(Continued)

(56) References Cited

U.S. PATENT DOCUMENTS 4,309,568 A  1/1982 Merkle
4,309,569 A  1/1982 Merkle
(Continued)

FOREIGN PATENT DOCUMENTS

EP    0586022     3/1994
JP    63-225840   9/1988
(Continued)

OTHER PUBLICATIONS

Notice of Allowance (dated Jun. 6, 2014) for U.S. Appl. No. 10/539,648, filed Dec. 17, 2007, Conf. No. 6660.
(Continued)

*Primary Examiner* — Brandon S Hoffman
*Assistant Examiner* — Nega Woldemariam
(74) *Attorney, Agent, or Firm* — Schmeiser, Olsen & Watts, LLP; Mark Vallone

(57) ABSTRACT

A method and system. A computer iteratively processes a unique condition digest of at least two condition digests in each iteration of a loop for a sufficient number of iterations to process all condition digests of the at least two condition digests. The processing in each iteration includes concatenating a reference digest with the unique condition digest of the iteration to generate a concatenand and hashing the concatenand to generate a hashed concatenand that serves as the reference digest for the next iteration if the next iteration is performed. Each unique condition digest is a different condition digest in each iteration of the loop. The regenerated reference digest of the last iteration of the loop is a last digest.

20 Claims, 4 Drawing Sheets

Related U.S. Application Data

No. 10/539,648, filed as application No. PCT/GB03/05107 on Nov. 24, 2003, now Pat. No. 8,862,886.

(58) Field of Classification Search
USPC .......................................................... 713/176
See application file for complete search history.

(56) References Cited

U.S. PATENT DOCUMENTS

| | | | |
|---|---|---|---|
| 4,625,076 | A | 11/1986 | Okamoto et al. |
| 4,656,474 | A | 4/1987 | Mollier et al. |
| 4,881,204 | A | 11/1989 | Takokoro et al. |
| 4,881,264 | A | 11/1989 | Merkle |
| 5,157,726 | A | 10/1992 | Merkle et al. |
| 5,995,625 | A * | 11/1999 | Sudia .................. G06F 21/6209 705/51 |
| 6,571,335 | B1 | 5/2003 | O'Donnell et al. |
| 7,099,479 | B1 | 8/2006 | Ishibashi et al. |
| 7,099,846 | B1 | 8/2006 | Ishibashi et al. |
| 7,269,564 | B1 | 9/2007 | Milsted et al. |
| 2001/0034839 | A1* | 10/2001 | Karjoth ................ H04L 9/3236 713/190 |
| 2002/0002468 | A1 | 1/2002 | Spagna et al. |
| 2002/0094090 | A1 | 7/2002 | Iino |
| 2002/0116382 | A1 | 8/2002 | Koyama et al. |
| 2003/0074565 | A1 | 4/2003 | Wasilewski et al. |
| 2003/0135464 | A1 | 7/2003 | Mourad et al. |
| 2008/0126805 | A1 | 5/2008 | Owlett et al. |
| 2015/0058636 | A1 | 2/2015 | Owlett et al. |

FOREIGN PATENT DOCUMENTS

| | | |
|---|---|---|
| JP | 01-163871 | 6/1989 |
| JP | 06-224896 | 8/1994 |
| JP | 2002-203186 | 7/2002 |
| JP | 2002-216062 | 8/2002 |
| WO | 99/40702 | 8/1999 |

OTHER PUBLICATIONS

RCE (Apr. 17, 2014) for U.S. Appl. No. 10/539,648, filed Dec. 17, 2007, Conf. No. 6660.
Notice of Allowance (dated Mar. 7, 02014) for U.S. Appl. No. 10/539,648, filed Dec. 17, 2007, Conf. No. 6660.
Reply Brief (Mar. 21, 2011) for U.S. Appl. No. 10/539,648, filed Dec. 17, 2007, Conf. No. 6660.
Examiner's Answer (dated Jan. 20, 2011) for U.S. Appl. No. 10/539,648, filed Dec. 17, 2007, Conf. No. 6660.
Appeal Brief (Oct. 12, 2010) for U.S. Appl. No. 10/539,648, filed Dec. 17, 2007, Conf. No. 6660.
Notice of Appeal (Aug. 10, 2010) for U.S. Appl. No. 10/539,648, filed Dec. 17, 2007, Conf. No. 6660.
Final Amendment (dated Apr. 19, 2010) for U.S. Appl. No. 10/539,648, filed Dec. 17, 2007, Conf. No. 6660.
Final Office Action (dated Feb. 17, 2010) for U.S. Appl. No. 10/539,648, filed Dec. 17, 2007, Conf. No. 6660.
Amendment (dated Nov. 12, 2009) for U.S. Appl. No. 10/539,648, filed Dec. 17, 2007, Conf. No. 6660.
Office Action (dated Aug. 18, 2009) for U.S. Appl. No. 10/539,648, filed Dec. 17, 2007, Conf. No. 6660.
Preliminary amendment (dated Jun. 15, 2005) for U.S. Appl. No. 10/539,648, filed Dec. 17, 2007, Conf. No. 6660.
Notice of Allowance (dated Jan. 5, 2016) for U.S. Appl. No. 14/491,206, filed Sep. 19, 2014, Conf. No. 6366.

* cited by examiner

GENERATION OF A DIGITAL SIGNATURE

This application is a continuation application claiming priority to Ser. No. 14/491,206, filed Sep. 19, 2014, now U.S. Pat. No. 9,306,752, issued Apr. 5, 2016, which is a continuation application to Ser. No. 10/539,648, filed Dec. 17, 2007, U.S. Pat. No. 8,862,886, issued Oct. 14, 2014.

FIELD OF INVENTION

The present invention relates to methods, apparatus and computer programs for generating and/or using electronic signatures and/or for reporting changes of status of messages, documents and other resources.

BACKGROUND

In ordinary non-electronic commerce, it is quite common for people to add a handwritten condition above their signatures: conditions such as "subject to contract", "delivery required within seven days", "paid under protest", or "without prejudice". The legal force of some of these annotations may be questionable, but to the person who writes the comment that does not matter—what matters is that people want to add these conditions. In other cases, conditions may be crucial to a business negotiation.

In electronic commerce, there is typically no opportunity to specify conditions in this way, and so a decision has to be made as to whether to electronically sign without conditions or not to sign. A vendor may lose on-line sales because of a minor legal question which the potential purchaser did not feel able to resolve on-line; or a customer who does sign may be deterred from future purchases. Unhappy customers do not come back.

These examples are typical of business-to-consumer applications, but business-to-business applications have the same need. There have been press reports of a busy goods-inwards manager who was asked to sign what appeared to be a delivery note for a vending machine and who did not realize he was in fact signing a personal agreement to lease the vending machine for several years. When his company decided to change vending-machine supplier, the supplier approached the manager personally for him to fulfill the contract he signed. Regardless of whether an individual court would uphold the contract or find it invalid and unenforceable, it would have been better for the manager if he had been able to add a condition (preferably drafted by his company's legal advisers) saying that he was signing only to confirm delivery. This is not made possible by typical electronic commerce solutions.

Digital signatures can be used for the same purposes as handwritten signatures—to confirm the signer's acceptance of an agreement and to authenticate a document or message. Generally, a digital signature must be able to confirm the identity of the signer. The simple form of a digital signature for a message is to apply acryptographic "hash" or "digest" function (using an algorithm such as the Message Digest algorithm MD5 or the Secure Hashing Algorithm SHA/1) to the message to produce a short digest representing the longer message. The digest or hash value is a fixed size string produced by applying the hash function to an input which may be of almost any length. The digest is then encrypted with the signer's private signature key to yield a signature block for the message (for example using the Digital Signature Algorithm, DSA). The message, the signature block, the algorithms used for hashing and encryption, and a way of obtaining the signer's public key are all sent to the recipient who can confirm the validity of the signature block by hashing the message, decrypting the signature block, and comparing the resulting short digests. The public key may be, for example, obtained from a digital certificate issued by a trusted third party.

A dual private/public key cryptographic system is disclosed in, for example, U.S. Pat. No. 5,157,726. U.S. Pat. No. 5,157,726 discloses such a system for authenticating a digital signature. A document is signed using the secret key and then the public key is used for checking authenticity. Processes for creating digital signatures are exemplified in U.S. Pat. Nos. 4,881,264, 4,309,569, 4,625,076 and U.S. Pat. No. 4,656,474 and in international standards ISO 9796 and CCITT X509).

Byounngcheon Lee and KwangjoKim, Fair Exchange of Digital Signatures Using Conditional Signature', Symposium on Cryptography and Information Security (SCIS) 2002, 29 Jan.-1 Feb. 2002, Shirahama, Japan, refers to conditional signatures'. This allows signer-chosen conditions to be used as private negotiation statements in two-party communications, and focuses in particular on the achievement of a fair exchange' of unconditional signatures in response to verification of conditional signatures. The conditional signatures' of Lee et al are signatures on a message and condition together, and specifically a signature using a conventional signature scheme to sign a combination of the message and a function of the condition.

There remains a need in the art for solutions which address one or more of the problems which are unresolved by the above references, such as solutions which offer users some of the apparent increased flexibility of non-electronic solutions.

SUMMARY OF INVENTION

Aspects of the present invention provide methods, apparatus and computer programs for generating and using conditional electronic signatures. A method for generating a conditional electronic signature according to a first aspect of the invention, performed in response to one or more conditions being specified for an electronic signature of a data item, comprises the steps of: encrypting the data item, encrypting the one or more conditions separately from the data item, combining the encrypted data item and the encrypted one or more conditions, and encrypting the combination to generate a digital signature block that inherently represents the data item and the one or more conditions and enables cryptographic verification of both the data item and the one or more conditions.

The data item may be a message, a document, an image file, or any other data resource.

If a plurality of conditions are specified by different sources or at different times, each condition is preferably separately encrypted (i. e. separate from each other as well as separate from the data item) before being combined and further encrypted.

The encryption of the data item and separate encryption of the conditions are preferably one-way hashing steps producing concise, verifiable representations of the original data item and conditions.

The steps of combining the hashed data item and conditions and then encrypting the combination preferably comprise the steps of: concatenating the hashed data item and hashed conditions, hashing the product of the concatenation to produce a final digest; and further encrypting the final digest to produce a conditional signature. The step of encrypting the final digest preferably uses a private key of a public/private key cryptographic solution.

In an alternative implementation, cryptographic processing other than hashing-such as Cipher Block Chaining (CBC)—is used for encrypting each of the data item and the conditions, and for the step of encrypting the concatenand which results from the concatenation of these two encrypted items. The cryptographic process selected for performing the encryption of the concatenand is one-such as a CBC process-which operates differently on each half of the concatenand according to what is in the other half, so that the encryption block obtained by encrypting the concatenand could not be obtained by separately encrypting each half of the concatenand and then concatenating. This provides assurance that a verification of a digital signature applied to the concatenand will not give a positive result if a message and a condition are put together by someone who is not authorized to do so.

In an alternative embodiment of the invention, for communicating documents within a closed group of participants who are authorized signatories, the final digest may be signed using a symmetric key known only to members of the group. Each member of the group will be able to verify the signature to check that the data item and condition have been signed by a member of the group.

A digital signature' or electronic signature' in the context of the present specification are the results of digital processing of an item which enable authentication of the item. Once digitally signed, any changes to the signed item will result in an identifiable loss of authenticity. Such signatures may be verifiable digital identifiers of a signatory (such as an author, acknowledger, or approver) including both those with and those without a digitized image of the signer's handwritten signature. The generation of such digital images is well known in the art. To simplify the following description, example solutions will be described which do not include such images.

A condition' in the context of the present specification may be an absolute requirement, without which a contract signatory considers his or her signature not binding. The condition may or may not require some action such as an explicit acceptance by the recipient of the signed data item. Alternatively, a condition' may be a comment or preference which states the intention or understanding of the signatory but which is not an absolute requirement. The word condition' is used herein to refer to both absolute requirements and comments. The present invention enables conditions to be linked unambiguously to signed data items and to the identity of the signatory.

Preferred embodiments of the invention enable more than one condition to be specified and separately signed. In particular, different conditions may be specified by different parties to an electronic communication or transaction or at different stages of a negotiation. Preferred embodiments of the invention support multiple messages or other data items from different sources being cryptographically signed, combined and further encrypted, and distributed in an encrypted form. Support is also provided for multiple messages which are each intended to be intelligible to different recipients, and which are encrypted using the public keys of the specific recipients who are entitled to read the different messages. All recipients can use the digest hierarchy to ensure that no part of the set of messages has been changed.

Separate encryption of data items and conditions, separate encryption of each of a plurality of conditions, and applying a digital signature to a combination of the separate encrypted items, provides the advantage that each component can be verified if the relevant signature blocks are available for verification. Furthermore, specific encrypted components may be decrypted without exposing other components in a clear text form. This may be especially useful where not all communicating entities have authorized access to all components of an encrypted package (the original data item and conditions) and different entities have authority to see different components. There may be a number of different signatories involved in a single transaction, each signatory either transmitting a document (or a representation of it) or providing an approval or other comments or conditions. Different components may be verified by different entities or at different times.

In alternative embodiments, the invention may be used to enable authentication (validating the authenticity of a message and associated conditions) without any restriction on read access to the message or conditions. Each addition of a condition to a data item is accompanied by the step of generating a new hash value or a new digital signature, and then the hash value or signature is included within a transmission package which also includes the data item and the condition.

A method of verifying an electronic signature according to an embodiment of the invention comprises the steps of: decrypting the signature using a public decryption key and comparing the decrypted signature with the final digest resulting from the previously described hashing of the product of the concatenation. In this way, verification of both the data item and the conditions can be performed-potentially without ever converting original messages or conditions to a cleartext form. This maintains security—for example if not all participants in a communication are authorized to see the originals but they are authorized to verify authenticity using the public key.

Another important potential benefit of the present invention is reduced network traffic, compared with verification solutions that require return to the originator of an actual digital contract before the verification processing can begin, since one embodiment of the present invention involves return of a signed hash value only. A particular application in which this benefit is emphasized is one in which it is the sender of a signed data item who wishes to verify that an unaltered version of the data item was successfully received. Returning a signed digest to the sender can enable the sender to decrypt and verify that the decrypted digest is as expected.

In an embodiment in which a message can contain material destined for different addressees, an addressee who has no need for material addressed to someone else can save network time and storage space by receiving only digests of extraneous material.

In many commerce applications, a recipient of a signed message uses the message to prepare one or more forms, such as an order form or a payment instruction. If the signer is not willing to sign the message exactly as sent, his or her intentions will be much clearer to the recipient if his or her conditions are made available to the recipient by adding a separate condition rather than by editing the message to be signed. The present invention provides a mechanism for adding such conditions.

According to another aspect of the invention, there is provided an electronic signature processing apparatus for generating a conditional digital signature in accordance with a method described above.

A further aspect provides and apparatus for verifying the authenticity of a data item and one or more associated conditions in accordance with a method described above.

The present invention may be implemented in a computer program product, comprising program code recorded on a machine-readable recording medium, for controlling the operation of a data processing apparatus on which the program code executes.

Further aspects of the invention provide a method, apparatus and computer program for disseminating a change of status of a data item such as a document, including disseminating status change information to each recipient of the data item which received the data item prior to the status change. Such a solution is advantageous for handling countermanding in the context of electronically signed documents, where a first authorized approver signs a document or comment to indicate approval and then a second authorized approver reverses that approval.

BRIEF DESCRIPTION OF DRAWINGS

Preferred embodiments of the present invention are described in more detail hereafter, by way of example, with reference to the accompanying drawings in which.

DETAILED DESCRIPTION OF PREFERRED EMBODIMENTS

Figure 1:
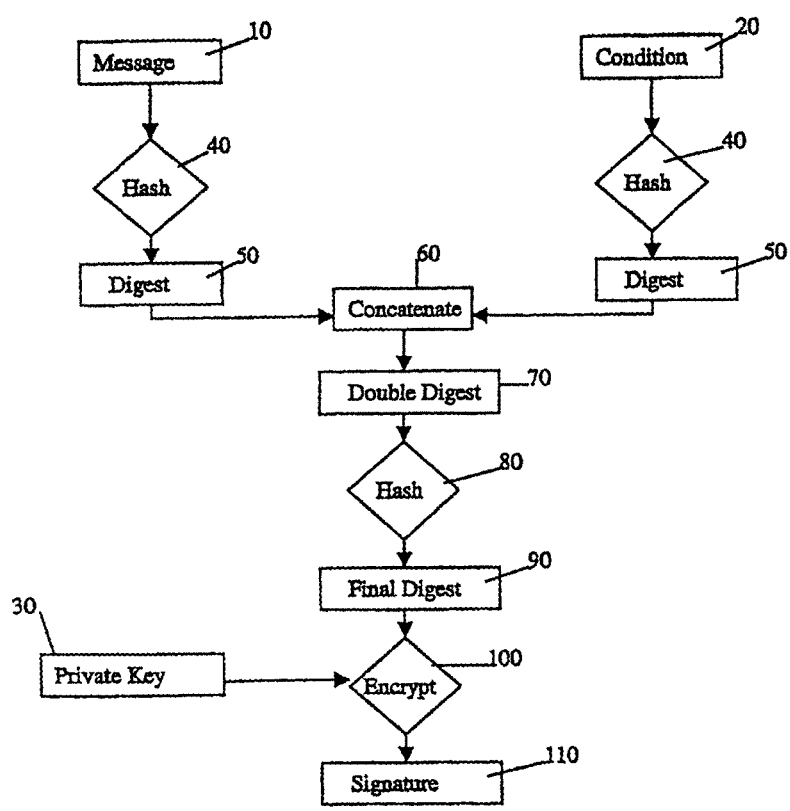
FIG. 1 shows a sequence of steps of a method for generating a conditional signature according to a first embodiment of the invention.

FIG. 1 shows a process for the construction of a simple conditional signature. The inputs to the process are the original message 10 to be signed, the statement of the conditions 20 that the signatory is attaching to his signature, and the private key 30 of the signer's public/private key pair for signing. Controls (in IDEFO terms) to the process are the hashing function and the encryption function to be used.

The message and the condition are both hashed 40 to produce digests 50. These digests are concatenated 60, the digest of the message first and the digest of the condition second. The concatenand 70, or double digest, is then itself hashed 80, producing the final digest 90. This is then encrypted 100 with the private key 30, producing the conditional signature block 110.

The message, the condition, and the conditional signature block are then sent to the recipient together with the algorithms used for hashing and encryption and the signer's public key (or information regarding how to obtain it). In this first implementation, the recipient is able to decrypt the conditional signature block to retrieve the final digest, and also to replicate the hashing and concatenation steps on the original message and condition to re-create the final digest. These two versions can then be compared. If the two versions of the final digest are equal, the message and condition are authentic. If not equal, the message and condition cannot be relied on. In this first implementation, there is no restriction on read access to the message or condition—the sole purpose of the hashing, concatenation and encryption steps are to enable verification of authenticity.

In a second implementation of the invention, only the final signature block and the initially hashed message and hashed condition (the two initial digests) are transmitted to the recipient. In this case, verification can be performed without exposing either the message or the conditions during the verification processing. This enables verification to be performed by an entity which is not authorized to receive the original message and/or condition in cleartext form.

Figure 2:
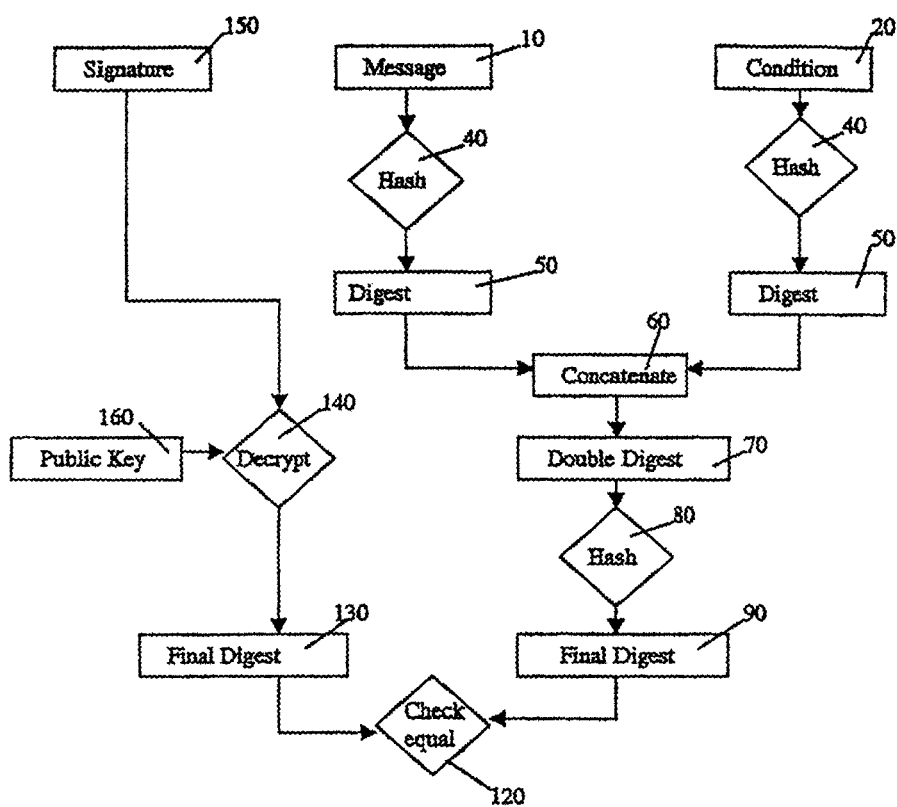
FIG. 2 shows a sequence of steps of a method for verifying a conditional signature according to an embodiment of the invention.

FIG. 2 shows a sequence of steps for verifying a conditional signature generated according to the first implementation of the invention described above. The recipient can confirm that the received conditional signature is valid—that is, that the conditional signature block was produced by means of the above process using the above inputs—by creating the final digest as above and comparing it 120 with the result 130 of decrypting 140 the conditional signature block 150 using the public key 160 of the public/private key pair.

The process of separately hashing messages and conditions provides a mechanism that allows the recipient to separately verify that each of the original message and conditions are unmodified, since alterations to the original message or condition will change the values of the respective digests. When any such modification has taken place, the signed final digest will not be equal to the calculated final digest. Such hashing of the initial inputs also saves on communication overheads in cases where only the digests need to be transmitted for verification purposes—as compared with solutions requiring transmission of original documents and conditions to a verifier entity. There is also a potential security benefit here—if one or more messages or conditions is not to be revealed to an addressee, the solution's avoidance of the need to transmit the original message or condition maintains the required security.

Hashing a concatenation of the digests resulting from separately hashing the message and conditions is desirable since it allows a determination of whether the message and conditions have been altered, but also assures the recipient that they were combined by the signer. With some encryption algorithms, typically those which do not use Cipher Block Chaining (CBC), the encryption of a concatenation is the same as the concatenation of the encryptions:

$$E(k, \text{concat}(x,y)) = \text{concat}(E(k,x), E(k,y))$$

Such cryptographic methods enable use of a message and a condition together when they do not belong together. The hashed double digest solution within the present embodiment of the invention, and cryptographic signing of the resulting final digest, does not have this problem.

Signing the final digest (for example using the signer's private encryption key) ensures that the final digest is unalterable without destroying its authenticity. In the present embodiment, nobody except the signer has access to the private key and so only the signer can perform the particular encryption.

The process described above not only confirms that it was the signer himself or herself who created the signature; it also confirms that neither the message nor the condition have been changed since the conditional signature block was created.

Figure 3:
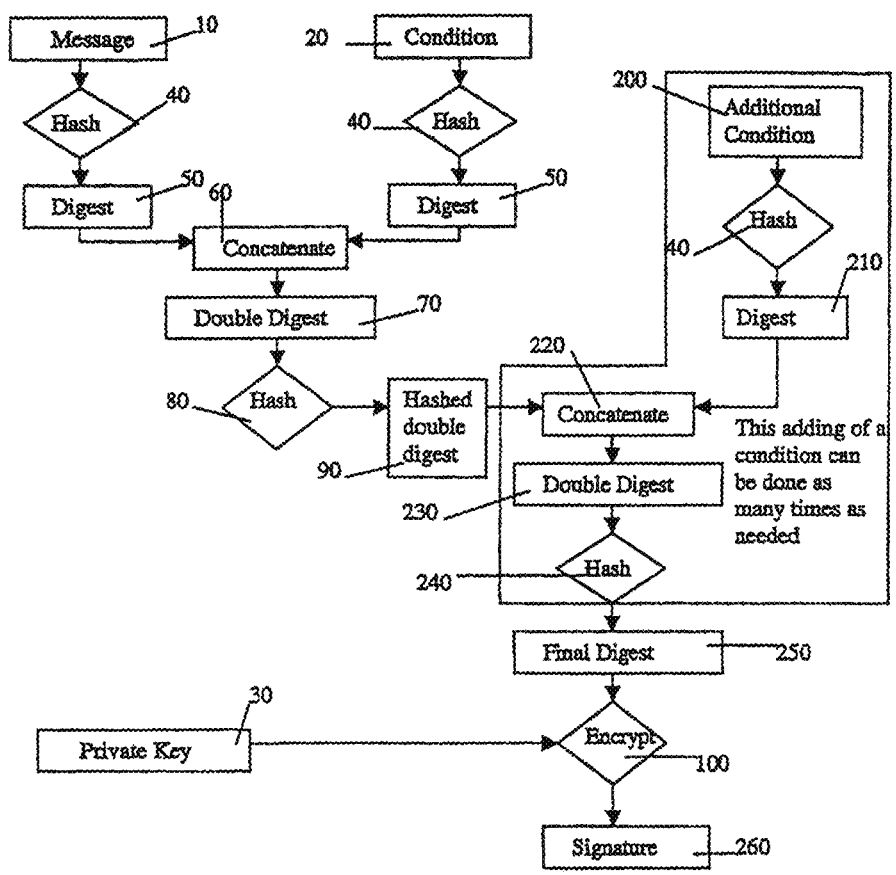
FIG. 3 shows the steps of a method for adding several conditions to a message according to an embodiment of the invention.

The process described above can be extended by repeating the concatenation and hashing of the resultant double digest, as represented in FIG. 3, so that users (possibly a plurality of users with different roles in a communication or negotiation) can add multiple separate conditions if required. Thus the processing of the additional condition 200 shown in FIG. 3 is representative of the processing of any other such additional conditions of said multiple separate conditions. Further extensions include applying procedures for timestamping of the conditional electronic signatures.

In FIG. 3 a message 10, representing a data item, is hashed 40 to generate a digest 50 of the message 10. The conditions 20 and 200 are each hashed 40 separately from each other and separately from the message 10 to generate the digests 50 and 210 respectively corresponding to the conditions 20 and 200. Each additional condition 200 of the multiple separate conditions is similarly hashed 50 to generate the corresponding digest 210. Thus, the digests 50 and 200 collectively represent multiple digests.

FIG. 3 depicts processing the multiple digests in an loop (i.e., in an iterative process), wherein each iteration of the loop concatenates a reference digest with a unique digest of the multiple digests, wherein the reference digest is an output digest of the immediately preceding iteration. Initially, the reference digest is the digest 50 resulting from hashing 40 the message 10. In the first iteration, the reference digest 50 is concatenated with the unique digest of the first iteration (i.e., the unique digest resulting from the hash of the condition 20) to generate a concatenand (i.e., the double digest 70), The concatenand 70 is hashed 80 to generate a hashed double digest 90 which becomes the reference digest for the second iteration. In the second iteration, the reference digest 90 is concatenated with the unique digest of the second iteration (i.e., the digest 210) to generate a concatenand (i.e., the double digest 230). The concatenand 230 is hashed 240 to generate the reference digest for a third iteration (if there is a third iteration) or the final digest 250 (if there is no third iteration, as in FIG. 3). The reference digest outputed from the last iteration of the loop is called the "last digest" (e.g., the final digest 250 in FIG. 3).

In FIG. 3, the last digest final digest 250) is encrypted 100 to generate a digital signature block or signature 260. The encrypting 100 comprising signing the last digest with a digital signature comprised by a signer who performs the signing using a private key 30. The digital signature block or signature 260 represents the message 10, the condition 20, and condition(s) 200 and enables cryptographic verification of the message 10, the condition 20, and condition(s) 200.

When there is a sequence of conditions, either created at one time or at different times, it is satisfactory for some applications for the final double digest to be signed. However, if this alone is signed then a recipient is unable to check interim signatures and has to take the word of the final signer that the whole structure is authorized. In the case where all the conditions are being asserted by the same person (for example when a house purchase is subject to contract, subject to mortgage and subject to survey) the presence of only one signature for the set of conditions is often acceptable. Another situation is where there are several signers but the identity of one or more of the interim signers is to be kept secret. In this case, signing only the final digest can be advantageous.

However, in cases in which there are several signers and recipients need to be able to confirm all the interim signatures, all the signature blocks must be available. Two implementations for satisfying this requirement are as follows:
1. The construction of each new double digest is performed by concatenating the preceding double digest to the hash of the new condition and hashing the result. All necessary signature blocks are then sent to the recipients alongside this construction. In addition to the final signature block, the signature blocks for interim double digests are necessary in those cases for which all signing actions are required to be verified.
2. In an alternative implementation, each new double digest is constructed by concatenating the previous signature block to the hash of the new condition and hashing the result. This implementation does not allow for the omission of interim signatures.

Figure 4:
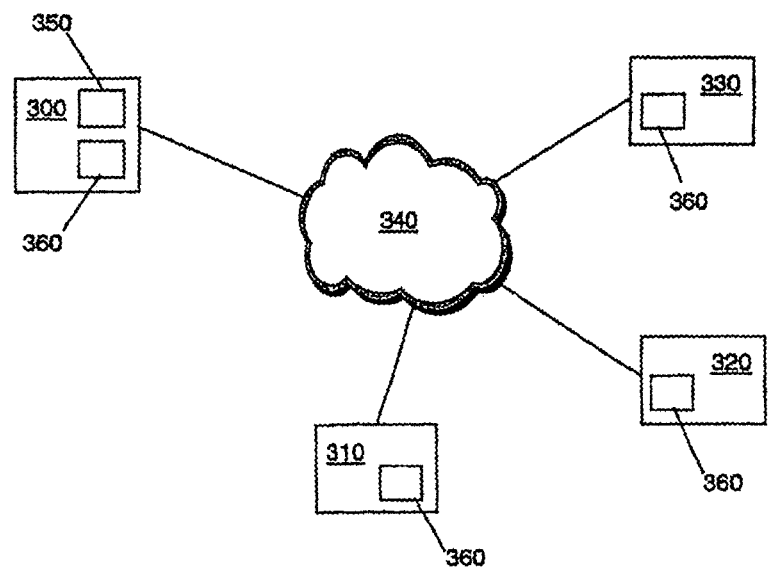
FIG. 4 is a schematic representation of apparatus which is suitable for use in a method according to the invention.

An example hardware environment is shown schematically in FIG. 4, in which a first user computer 300 is connected to a network 340—such as the Internet or an intranet or other network—and is running computer programs which enable sending and receiving of documents to and from other network-connected computers 310, 320, 330. The first computer 300 operates in accordance with computer programs 350, 360 stored on a computer readable medium to perform hashing, concatenation and encryption/decryption steps either for generating (350) conditional electronic signatures, verifying (360) such signatures to check authenticity of received documents, or both.

As described in further detail herein, preferred embodiments of the present invention include a data processing system comprising one or more computers which operate in accordance with computer programs installed thereon to generate, verify or use conditional electronic signatures.

Some portions of the following description are explicitly or implicitly presented in terms of algorithms and symbolic representations of operations on data within a computer memory. These algorithmic descriptions and representations are typical of the notation found most effective by those skilled in the data processing arts to convey the substance of their work to others skilled in the art. An algorithm is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, digests, elements, components, symbols, characters, terms, numbers, or the like.

However, the above and similar terms are to be associated with the appropriate physical quantities and are merely convenient labels applied to these quantities. Throughout the present specification, discussions utilising terms such as "computing", "calculating", "determining", "comparing", "generating", "selecting", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

The present specification also discloses apparatus for performing the operations of the methods. Such apparatus may be specially constructed for the required purposes, or may comprise one or more general purpose computers or other devices selectively activated or reconfigured by a computer program stored in the computer. The algorithms presented herein are not inherently related to any particular computer or other apparatus. Various general purpose machines may be used with programs in accordance with the teachings herein. Alternatively, the construction of more specialised apparatus to perform the required method steps may be appropriate.

In addition, the present specification also discloses a computer readable medium and a computer program recorded thereon for performing the operations of the methods. The computer readable medium is taken herein to include any transmission medium for communicating the computer program between a source and a destination. The transmission medium may include storage devices such as magnetic or optical disks, memory chips, or other storage devices suitable for interfacing with a general purpose computer. The transmission medium may also include a hard-wired medium or a wireless medium (such as exemplified in the GSM mobile telephone system). The computer programs implementing the invention are not intended to be limited to any particular programming language or implementation thereof. It will be appreciated that a variety of programming languages and coding thereof may be used to implement the teachings of the disclosure contained herein.

Where reference is made in any one or more of the accompanying drawings to steps and/or features, which have the same reference numerals, those steps and/or features have for the purposes of this description the same function (s) or operation (s), unless the contrary intention appears.

A specific embodiment of the invention will now be described, using a mathematical notation. The cryptographic procedure described below (symmetric-key encryption) is an example of a suitable cryptographic procedure which avoids the processing delays of some alternative cryptographic solutions, but other known cryptographic operations may be used such as slower public key encryption.

Let concat (x, y) be defined to be the bit-string that results from the concatenation of bit-string x and bit-string y.

Let h (x) be defined to be the short bit-string that results from applying the hash (alias digest) algorithm h to the bit-string x.

It has been shown that, for the hash algorithms SHA/1 and MD5, h (concat (h (x), h (y))) preserves cryptographic strength. That is, even if I know all three of the bit-string x, the bit-string y, and the algorithm h, it is very difficult to find bit-strings a and b—one at least of which is different from x and y—such that: h (concat (h (a), h (b))))=h (concat (h(x), h (y))).

Very difficult in this context means at least as difficult as finding p not equal to q such that h (p)=h (q). Therefore, "double digesting" does not introduce any weakness into the system.

Let E (k, x) be defined to be the bit-string that results from encrypting the bit-string x using the key (also a bit-string) k, when k is not zero.

Let E(0, x) be defined to be equal to x.

Let m1, m2, . . . mk (where k is a positive integer) be the messages that are to be signed and c0, c1, c2, . . . cn (where n is a positive integer) be the conditions or comments that are to be attached.

Let p1, p2, . . . pk be the public keys of the entities which are to be able to read each of the messages.

Different messages aimed at different recipients but signed together are useful. It may be important to a merchant to know that a customer has sent a message to their bank authorizing payment. However, whenever the merchant does not need to know the details of the customer's account, the customer should be able to keep that information confidential. It may be important to the bank to have a digest which identifies the transaction for which payment is requested, but the bank does not need to know what the customer is buying and the customer may wish to retain confidentiality.

Let q1, q2, . . . qn be the public keys of the entities which are to be able to read each of the conditions.

Any p or q value may be zero if the corresponding message or condition is not confidential.

Let r1, r2, . . . rk and t1, t2, . . . tn be random symmetric keys.

The "multiple message digest", which represents the message set m1, m2, . . . mi as a whole, is to be called Mi.

M1=h (E (r1, m1)) and the crypto block E (p1, r1) is to accompany M1.

If i>1 then Mi=h (concat((M (i−1)), h (E (ri, mi)))) and the digests h (E (r1,m1)), h (E (r2, m2)), . . . h (E (ri, mi) and the crypto blocks E (p1,r1), E (p2, r2), . . . E (pi, ri) are to accompany Mi.

Mk is then a multiple message digest which represents the complete message set m1, m2, . . . mk as a whole.

Let s1, s2, . . . sn be the secret keys of the signatories of conditions c1, c2, . . . cn respectively.

The "conditional signature", which represents Mk and the conditions c1, c2, . . . cj as a whole, is to be called Sj.

S1=E (s1, h (concat (Mk, h (E (t1, c1))))) and the digests h (E (r1, m1), h (E (r2, m2)), . . . h (E (rk, mk)), . . . h (E (t1, c1)) and the crypto blocks E (p1, r1), E (p2, r2), . . . E (pk, rk) and E(q1, t1), are to accompany S1.

If j>1 then Sj=E (sj, h (concat((S (j−1)), h (E (tj, cj))))) and the digests h (E (r1, m1), h (E (r2, m2)), . . . h (E (rk, mk)) and h (E (t1, c1), h (E (t2,c2)), . . . h (E(tj, cj) and the crypto blocks E (p1,r1), E (p2, r2), . . . E (pk, rk) and E(q1,t1), E (q2, t2), . . . E(qj, tj) are to accompany S1.

Sn is then the final conditional signature.

The embodiments of the invention described above in detail use public/private key encryption for signing the final digest. While this is a convenient technique for many applications, other digital signature techniques which use a key known only to an approved signer are also suitable.

Within a closed group, it is acceptable for some applications for the final digest to be signed with a symmetric key known only to the group. Each member of the group will then be able to check the signature and be sure that the message and the condition have been signed by a member of the group, although possibly not knowing for certain which member of the group signed. Such a symmetric key solution is generally not acceptable when sending messages outside a closed group, since in that case sending a key which enables checking of the signature also enables creation of an alternative signature using different messages or conditions. Signing the message using a private key solves this problem—although in some applications it is acceptable for a private key to be shared by a group of people.

Symmetric key encryption is generally faster than public/private key encryption. However, when signing an MD5 digest (16 bytes long) or aSHA/1 digest (20 bytes long) the size of the item being encrypted is not sufficiently long for the faster processing of symmetric-key encryption to be a significant improvement.

The conditional signature solution described above handles the situation where a document signed by one person has to be forwarded to another person for approval or verification before action is taken. Another situation which is not solved by known solutions is where one person gives approval, but another person countermands that approval. For simplicity, the following description will assume that the countermanding person has the authority to issue countermands.

Described below is a data processing system and a process, implementable in software, which can handle such countermanding.

One application of conditional signatures is to handle a document which needs two or more signatures before it is approved. The first signatory signs the document adding any necessary comment and the second signatory any necessary follow-up comment and signs the result. Taking an example from Canon law, a priest wishing to publish a book sends the text to an official in his bishop's office who reads the text. All being well, the official endorses the book "nihil obstat" (or "nothing stands in its way"). The bishop can then endorse the book "imprimateur" (or "let it be printed").

The solution is not limited to any specific document status. For example, a document may even be signed subject to conditions such that the approval indicated by the signature is subject to legal appeal proceedings (for example, for the period of any applicable deadline for the filing of an appeal).

Some enterprises, which allow their officers to make decisions and authorize documents, also allow the functional superiors of those officers to countermand the initial authorization. Although countermanding will not always be a desirable practice, there is a need for a solution which handles countermanding of approvals in those enterprises in which the practice is permitted. A system and method for solving this problem are described below, which ensure that everyone who has received a copy of the initial authorization will receive a copy of the countermand. This includes those to whom the original signatory sent the signed document, but also those who have received a copy by a more indirect route.

The Open Group standard X.509 version 2 describes a related solution for the specific case of documents which are public-key certificates. When a Certificate Authority (CA) issues a public-key certificate asserting that an entity known by a particular name has a particular public key, then the form of the public-key certificate contains an address from which a Certificate Revocation List (CRL) can be obtained. The CRL contains a list of those certificates which were issued by the authority, but which have subsequently been revoked (such as because the key owner has left the CA's organization, or because the corresponding private key has become compromised, or because the certificate was issued in error, or because the certificate was obtained by fraud). The nature of a CA, and the format of a public-key certificate, an address, and a CRL are all defined in the standard.

As well as being restricted to a fixed form of message, the CRL process described in the standard make no effort to send the CRL to anyone, let alone to everyone who has received the original message.

The solution supporting countermanding comprises three parts:
1. "Active content" is automatically included in the condition when someone in an organization that permits countermanding signs a document. The active content may be implemented using MicroActiveX controls or, as in the preferred implementation, as a Java™ "aglet" comprising encapsulated code which can be run by a Java runtime system on any platform to which the message is sent—the general solution is independent of the specific active content tool used. Every time the document is forwarded to someone else, this active content is executed and it sends the address (for example, the e-mail address) of each recipient to a register of recipients maintained by the organization.
2. An advanced e-mail system (for example, the Lotus Notes communication software from Lotus Development Corporation) recognizes the difference between a message which contains a simple epilogue identifying the author (which could be forged, but which is adequate for most informal e-mail) and a message which is to be cryptographically signed using the author's private key. The latter can be forged only if someone can find the password the author uses to protect the private key. The countermanding solution extends the e-mail system so that the e-mail system:
i. recognizes the presence of active content in a signed message, and executes the active content whenever the message is forwarded;
ii, creates appropriate active content when a message is signed (a new option of "sign as instruction" is provided within the e-mail system to allow for an organization's wish to use the additional feature only when necessary); and
iii. recognizes the act of countermanding a message, which the e-mail system sends to the registry.
3. The third part of the solution is the register which is linked into the e-mail system so that it receives and retains the information it receives from each "signed-as-instruction" message's aglet. When a countermand is received, the e-mail system sends that countermand to all addresses registered as having received the original message. Additionally, the register keeps records of messages and countermands so that, if one of the recipients later forwards the message to an extra person, the register and e-mail system cooperate to send that extra person the countermand as well.

Since the active content (aglet) is a part of the condition attached to the message when it is signed, nobody can remove the aglet without altering the digest of the condition and thus invalidating the signing and cancelling the authorization.

More generally, the solution described above in relation to countermanding can be used for notification of any changes of status of a document or other data item. A countermanded message is a specific case of the more general situation where a documents status can be changed by a subsequent decision. The new status can be added to the document in the way described above for the conditional signature solution; and the new status can be communicated to all recipients of the document using the status change notification solution.

Another example application of the status change reporting solution is for reporting the reclassification of a document; from Restricted to Secret, say, or from Secret to Top Secret.

Method steps which achieve the status change reporting according to an embodiment of the invention include:
creation of active content for appropriate messages, using an appropriate active content writing mechanism;
recognition and execution of the active content by either the sender or the receiver of the message;
responsive to the submission of countermands or other changes of status, accessing a register which maintains a complete distribution list for such status changes and distributing a notification of the changes in status.

The register itself may be a distributed function and implemented by cooperating registers, each of which maintains the distribution list of recipients in its own area and forwards details of other recipients to the registers for their areas. However, an organisation may choose to implement a single register in circumstances where a full audit record of changes of status of the message or document is required.

The invention claimed is:
1. A method, said method comprising:
a computer iteratively processing a unique condition digest of a plurality of condition digests in each iteration of a loop for a sufficient number of iterations to process all condition digests of the plurality of condi- tion digests, said processing in each iteration comprising concatenating a reference digest with the unique condition digest of the iteration to generate a concatenand and hashing the concatenand to generate a hashed concatenand that serves as the reference digest for the next iteration if the next iteration is performed, each unique condition digest being a different condition digest in each iteration of the loop, the regenerated reference digest of the last iteration of the loop being a last digest.

2. The method of claim 1, said method further comprising:
said computer encrypting the last digest to generate a digital signature block that represents a data item and a plurality of conditions specified for a digital signature, said digital signature block comprising the digital signature.

3. The method of claim 2, wherein the digital signature block enables cryptographic verification of both the data item and the plurality of conditions.

4. The method of claim 2, wherein said encrypting comprises signing the last digest with the digital signature.

5. The method of claim 4, wherein said signing is performed by a signer and represents acceptance of the data item by the signer subject to the plurality of conditions.

6. The method of claim 4, wherein said signing is performed by a signer and represents acceptance of the data item by the signer, and wherein said acceptance is not subject to the plurality of conditions.

7. The method of claim 2, wherein the reference digest is equal to a digest of the data item, and wherein the digest of the data item is formed from a hashing of the data item.

8. The method of claim 2, said method further comprising:
said computer hashing each condition of the plurality of conditions separately from each other and separately from the data item to generate the plurality of condition digests respectively corresponding to the plurality of conditions.

9. The method of claim 2, said method further comprising:
said computer generating a communication, wherein the communication comprises the digital signature block, the data item, and the plurality of conditions; and
said computer sending the communication across a network to a recipient.

10. The method of claim 2, said method further comprising:
said computer generating a communication, wherein the communication comprises the digital signature block and does not comprise the data item and does not comprise the plurality of conditions; and
said computer sending the communication across a network to a recipient.

11. The method of claim 2, wherein the method further comprises:
said computer hashing a new condition to generate a digest of the new condition;
said computer concatenating the digital signature block with the digest of the new condition to generate a new digest;
said computer hashing the new digest to generate a hashed new digest; and
said computer encrypting the hashed new digest to generate a new digital signature block that represents the data item, the plurality of conditions, and the new condition and enables cryptographic verification of the data item, the plurality of conditions, and the new condition.

12. A computer program product, comprising a machine-readable hardware storage device having program code stored thereon, said program code upon being executed by a computer performs a method for generating a digital signature of a data item, said method comprising:
said computer iteratively processing a unique condition digest of a plurality of condition digests in each iteration of a loop for a sufficient number of iterations to process all condition digests of the plurality of condition digests, said processing in each iteration comprising concatenating a reference digest with the unique condition digest of the iteration to generate a concatenand and hashing the concatenand to generate a hashed concatenand that serves as the reference digest for the next iteration if the next iteration is performed, each unique condition digest being a different condition digest in each iteration of the loop, the regenerated reference digest of the last iteration of the loop being a last digest.

13. The computer program product of claim 12, said method further comprising:
said computer encrypting the last digest to generate a digital signature block that represents a data item and a plurality of conditions specified for a digital signature, said digital signature block comprising the digital signature.

14. The computer program product of claim 13, wherein the digital signature block enables cryptographic verification of both the data item and the plurality of conditions.

15. The computer program product of claim 13, wherein said encrypting comprises signing the last digest with the digital signature.

16. The computer program product of claim 13, wherein the reference digest is equal to a digest of the data item, and wherein the digest of the data item is formed from a hashing of the data item.

17. A data processing apparatus comprising a computer and a machine-readable recording medium coupled to the computer, said recording medium storing program code that when executed by the computer performs a method for generating a digital signature of a data item, said method comprising:
said computer iteratively processing a unique condition digest of a plurality of condition digests in each iteration of a loop for a sufficient number of iterations to process all condition digests of the plurality of condition digests, said processing in each iteration comprising concatenating a reference digest with the unique condition digest of the iteration to generate a concatenand and hashing the concatenand to generate a hashed concatenand that serves as the reference digest for the next iteration if the next iteration is performed, each unique condition digest being a different condition digest in each iteration of the loop, the regenerated reference digest of the last iteration of the loop being a last digest.

18. The data processing apparatus of claim 17, said method further comprising:
said computer encrypting the last digest to generate a digital signature block that represents a data item and a plurality of conditions specified for a digital signature, said digital signature block comprising the digital signature.

19. The data processing apparatus of claim 18, wherein the digital signature block enables cryptographic verification of both the data item and the plurality of conditions.

20. The data processing apparatus of claim 18, wherein said encrypting comprises signing the last digest with the digital signature.

* * * * *